US009532264B2

(12) United States Patent
Zhang et al.

(10) Patent No.: US 9,532,264 B2
(45) Date of Patent: Dec. 27, 2016

(54) BUFFER STATE REPORTING METHOD AND APPARATUS

(71) Applicant: Huawei Technologies Co., Ltd., Shenzhen, Guangdong (CN)

(72) Inventors: Yingyu Zhang, Shanghai (CN); Xinyu Huang, Shanghai (CN); Haijuan Yang, Shanghai (CN); Jiancheng Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 290 days.

(21) Appl. No.: 14/457,695

(22) Filed: Aug. 12, 2014

(65) Prior Publication Data

US 2014/0348118 A1 Nov. 27, 2014

Related U.S. Application Data

(63) Continuation of application No. PCT/CN2013/071489, filed on Feb. 7, 2013.

(30) Foreign Application Priority Data

Feb. 14, 2012 (CN) .......................... 2012 1 0032723

(51) Int. Cl.
H04W 28/02 (2009.01)
H04L 1/18 (2006.01)
H04W 72/12 (2009.01)
(52) U.S. Cl.
CPC ........ H04W 28/0278 (2013.01); H04L 1/1874 (2013.01); H04L 1/188 (2013.01);
(Continued)
(58) Field of Classification Search
CPC ............. H04W 24/10; H04W 72/1284; H04W 72/1252; H04W 74/0866; H04W 74/002; H04W 28/0278; H04W 72/1221; H04L 5/0007; H04L 5/0053; H04L 1/1812; H04L 1/1848; H04L 1/1874; H04L 1/188
See application file for complete search history.

(56) References Cited

U.S. PATENT DOCUMENTS 7,881,236 B2 *   2/2011   Park .................... H04W 74/08
                                                    370/278
7,961,680 B2 *   6/2011   Park .................... H04L 1/1812
                                                    370/229

(Continued)

FOREIGN PATENT DOCUMENTS

CN   101141445 A   3/2008
CN   101541099 A   9/2009

(Continued)

OTHER PUBLICATIONS

ETSI TS 136 321 V10.4.0 (Jan. 2012), titled LTE; Evolved Universal Terrestrial Radio Access (E-UTRA); Medium Access Control (MAC) protocol specification (3GPP TS 36.321 version 9.3.0 Release 9) was published Jul. 2010.*

(Continued)

Primary Examiner — Andrew Lai
Assistant Examiner — Hoyet H Andrews
(74) Attorney, Agent, or Firm — Leydig, Voit & Mayer, Ltd.

(57) ABSTRACT

Embodiments of the present invention disclose a buffer state reporting method and apparatus. The buffer state reporting method includes: triggering transmission of current buffer state report BSR information of a user equipment; and if the user equipment will transmit media access control protocol data unit MAC PDU data packets to a base station and the MAC PDU data packets include a newly transmitted MAC PDU data packet, carrying the BSR information in the newly (Continued)

transmitted MAC PDU data packet for transmission to the base station. In the buffer state reporting method and apparatus of the embodiments of the present invention, when multiple MAC PDUs are transmitted at the same time, BSR information is carried in a newly transmitted MAC PDU, so that a base station acquires BSR information on a user side in a timely manner, thereby improving performance of uplink scheduling for a user.

6 Claims, 6 Drawing Sheets

(52) U.S. Cl.
CPC .......... *H04L 1/1812* (2013.01); *H04L 1/1848* (2013.01); *H04W 72/1221* (2013.01)

(56) References Cited

U.S. PATENT DOCUMENTS

| | | | |
|---|---|---|---|
| 2006/0165045 A1 | 7/2006 | Kim et al. | |
| 2009/0122765 A1* | 5/2009 | Dimou | H04W 88/06 370/336 |
| 2010/0002630 A1* | 1/2010 | Park | H04L 1/1812 370/328 |
| 2010/0035581 A1* | 2/2010 | Park | H04W 74/08 455/412.1 |
| 2010/0150082 A1* | 6/2010 | Shin | H04W 72/1284 370/329 |
| 2010/0322165 A1* | 12/2010 | Yoo | H04L 1/1812 370/329 |
| 2011/0085509 A1* | 4/2011 | Park | H04W 74/08 370/329 |
| 2011/0141983 A1 | 6/2011 | Hong | |
| 2012/0218966 A1 | 8/2012 | Yamazaki et al. | |

FOREIGN PATENT DOCUMENTS

| | | | | |
|---|---|---|---|---|
| CN | 102056332 A | 5/2011 | | |
| EP | 2197235 A2 | 6/2010 | | |
| KR | WO 2009104929 A1 * | 8/2009 | ............. | H04W 8/26 |
| KR | 20100067342 A | 6/2010 | | |
| WO | WO 2006052085 A1 | 5/2006 | | |
| WO | WO 2010112236 A1 | 10/2010 | | |
| WO | WO 2011052774 A1 | 5/2011 | | |

OTHER PUBLICATIONS

3GPP TR 36.806 V0.3.1 (Feb. 2010), titled, 3rd Generation Partnership Project; Technical Specification Group Radio Access Network; Evolved Universal Terrestrial Radio Access (E-UTRA); Relay architectures for E-UTRA (LTE-Advanced) (Release 9) was published Feb. 2010.*
3GPP R1-094246, titled, Inter-cell Radio Resource Management for Heterogeneous Networks, Source: NTT DOCOMO; Agenda Item: 7.7 was published by 3GPP TSG RAN WG1 Meeting #58bis in Miyazaki, Japan, Oct. 12-16, 2009.*
K. V. Pradap, V. Ramachandran and S. Kalyanasundaram, "Uplink Buffer Status Reporting for Delay Constrained Flows in 3GPP Long Term Evolution," 2009 IEEE Wireless Communications and Networking Conference, Budapest, 2009, pp. 1-6. doi: 10.1109/WCNC. 2009.4918010.*
"3$^{rd}$ Generation Partnership Project; Technical Specification Group Radio Access Network; Evolved Universal Terrestrial Radio Access (E-UTRA); Medium Access Control (MAC) protocol specification (Release 10)," 3GPP TS 36.321, V10.1.0, pp. 1-53, 3$^{rd}$ Generation Partnership Project, Valbonne, France (Mar. 2011).
"3$^{rd}$ Generation Partnership Project; Technical Specification Group Radio Access Network; Evolved Universal Terrestrial Radio Access (E-UTRA); Radio Resource Control (RRC); Protocol specification (Release 10)," 3GPP TS 36.331, V10.4.0, pp. 1-296, 3$^{rd}$ Generation Partnership Project, Valbonne, France (Dec. 2011).
"Logical Channel Prioritization Procedure for Carrier Aggregation," 3GPP TSG-RAN WG2 Meeting #69bis, Beijing, China, R2-102088, 3$^{rd}$ Generation Partnership Project, Valbonne, France (Apr. 12-16, 2010).
"BSR remaining issues," 3GPP TSG-RAN WG2 Meeting #70, Montreal, Canada, R2-102957, 3$^{rd}$ Generation Partnership Project, Valbonne, France (May 10-14, 2010).
"BSR and UL grant in Msg2," 3GPP TSG-RAN2 Meeting #74, Barcelona, Spain, R2-113250, 3$^{rd}$ Generation Partnership Project, Valbonne, France (May 9-13, 2011).

* cited by examiner

US 9,532,264 B2

BUFFER STATE REPORTING METHOD AND APPARATUS

CROSS-REFERENCE TO RELATED APPLICATIONS

This application is a continuation of International Patent Application No. PCT/CN2013/071489, filed on Feb. 7, 2013, which claims priority to Chinese Patent Application No. 201210032723.0, filed on Feb. 14, 2012, both of which are hereby incorporated by reference in their entireties.

TECHNICAL FIELD

Embodiments of the present invention relate to the field of communications technologies, and in particular, to a buffer state reporting method and apparatus.

BACKGROUND

In a wireless communications system, a user acquires a certain uplink resource and a transmission mode through uplink scheduling by a base station, so as to transmit uplink data. A result of the uplink scheduling by the base station for the user depends on various factors. In addition to a result of measurement on a user's uplink channel by the base station and power information of the user, the base station further needs to acquire information about data size to be sent on a user side.

For example, BSR (Buffer State Report, buffer state report) information of the user is reported to the base station by using an MAC (Media Access Control, media access control) CE (Control Element, control element). Specifically, at an MAC layer, logic channel data and an MAC CE form an MAC PDU (Protocol Data Unit, protocol data unit), which is reported to the base station.

However, in a case in which multiple MAC PDUs are transmitted at the same time, the BSR information is transmitted to the base station in at most only one MAC PDU. When a newly transmitted MAC PDU and a retransmitted MAC PDU are transmitted at the same time, previous BSR information of the user is always retransmitted in the retransmitted MAC PDU. As a result, the base station cannot acquire current BSR information of the user for a long time, thereby affecting the uplink scheduling for the user.

SUMMARY

An objective of embodiments of the present invention is to provide a buffer state reporting method and apparatus, so as to ensure transmission of a buffer state report.

The objective of the embodiments of the present invention is achieved by using the following technical solutions:

An embodiment of the present invention provides a buffer state reporting method, including:

triggering transmission of current buffer state report BSR information of a user equipment; and if the user equipment will transmit media access control protocol data unit MAC PDU data packets to a base station and the MAC PDU data packets include a newly transmitted MAC PDU data packet, carrying the BSR information in the newly transmitted MAC PDU data packet for transmission to the base station.

An embodiment of the present invention provides a buffer state reporting apparatus, including:

a triggering unit, configured to trigger transmission of current buffer state report BSR information of a user equipment; and a transmission unit, configured to, if the user equipment will transmit media access control protocol data unit MAC PDU data packets to a base station and the MAC PDU data packets include a newly transmitted MAC PDU data packet, carry the BSR information in the newly transmitted MAC PDU data packet for transmission to the base station.

It can be seen from the technical solutions provided by the embodiments of the present invention that, when multiple MAC PDUs are transmitted at the same time, BSR information is carried in a newly transmitted MAC PDU, so that a base station acquires BSR information on a user side in a timely manner, thereby improving performance of uplink scheduling for a user.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
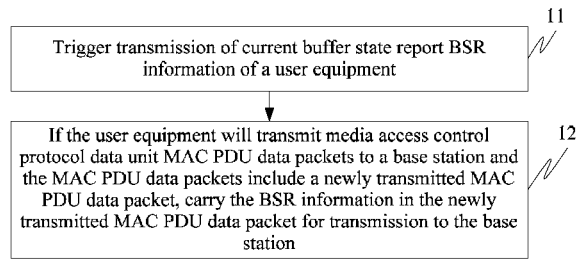
FIG. 1 is a schematic flowchart of a buffer state reporting method according to an embodiment of the present invention.

As shown in FIG. 1, an embodiment of the present invention provides a buffer state reporting method, including the following steps:

11: Trigger transmission of current buffer state report BSR information of a user equipment.

12: If the user equipment will transmit media access control protocol data unit MAC PDU data packets to a base station and the MAC PDU data packets include a newly transmitted MAC PDU data packet, carry the BSR information in the newly transmitted MAC PDU data packet for transmission to the base station.

The buffer state reporting method of this embodiment of the present invention may be executed by a UE (User Equipment, user equipment).

It can be seen from the technical solution provided by this embodiment of the present invention that, when multiple MAC PDUs are transmitted at the same time, BSR information is carried in a newly transmitted MAC PDU, so that a base station acquires BSR information on a user side in a timely manner, thereby improving performance of uplink scheduling for a user.

In the present invention, the terms newly transmitted MAC PDU data packet and retransmitted MAC PDU data packet are understood as follows: If an MAC PDU data packet fails to be sent and needs to be retransmitted, a "newly transmitted MAC PDU data packet" refers to the MAC PDU data packet before retransmission and a retransmitted MAC PDU data packet refers to the MAC PDU data packet during retransmission.

The buffer state reporting method of this embodiment of the present invention may be applied to a wireless communications system. The wireless communications system includes but is not limited to 3GPP LTE (3rd Generation Partnership Project Long Term Evolution, 3rd Generation Partnership Project Long Term Evolution), WCDMA (Wideband Code Division Multiple Access, Wideband Code Division Multiple Access), CDMA2000 (Code Division Multiple Access, Code Division Multiple Access), TD-SCDMA (Time Division-Synchronous Code Division Multiple Access, Time Division-Synchronous Code Division Multiple Access), WIMAX (Worldwide Interoperability for Microwave Access, Worldwide Interoperability for Microwave Access), and other wireless communications systems.

Optionally, the BSR information may be Periodic (periodic)-BSR information, or the BSR information may be Regular (regular)-BSR information.

Optionally, in step 12, a manner of carrying the BSR information in the newly transmitted MAC PDU data packet may include:

when triggering transmission of current BSR information of the user equipment, if MAC PDU data packets are carried on a single carrier for transmission to a base station and a newly transmitted MAC PDU data packet is among the MAC PDU data packets, carrying the BSR information in the newly transmitted MAC PDU data packet.

In a single-carrier application scenario, for example, SU-MIMO (Single User-Multiple Input Multiple Output, single user-multiple input multiple output), a user has multiple uplink transmit antennas and a channel environment allows multiple MAC PDUs to be transmitted at the same time.

Transmission of current BSR information of the user equipment is triggered in a triggering manner, for example, by a BSR timer. A specific triggering manner may be understood with reference to the prior art, and details are not described herein again.

Optionally, in step 12, the manner of carrying the BSR information in the newly transmitted MAC PDU data packet may include:

when triggering transmission of current BSR information of the user equipment, if MAC PDU data packets are carried on multiple carriers for transmission to a same base station and a newly transmitted MAC PDU data packet is among the MAC PDU data packets, carrying the BSR information in the newly transmitted MAC PDU data packet.

Optionally, in step 12, the manner of carrying the BSR information in the newly transmitted MAC PDU data packet may include:

in a heterogeneous network, when triggering transmission of current BSR information of the user equipment on the multiple carriers if MAC PDU data packets are carried on multiple carriers for transmission to a same base station and a newly transmitted MAC PDU data packet is among the MAC PDU data packets carried on the multiple carriers, carrying the BSR information in the newly transmitted MAC PDU data packet; or in a heterogeneous network, when triggering transmission of current BSR information of the user equipment on the carriers, if MAC PDU data packets are carried on multiple carriers for transmission to base stations, where each carrier is corresponding to a different base station, and a newly transmitted MAC PDU data packet is among the MAC PDU data packets on the multiple carriers, carrying the BSR information in the newly transmitted MAC PDU data packet; or in a heterogeneous network, when triggering transmission of current BSR information of the user equipment on the carriers, if MAC PDU data packets are carried on multiple carriers for transmission to base stations, where some carriers among the multiple carriers are corresponding to a same base station, and a newly transmitted MAC PDU data packet is among the MAC PDU data packets on the multiple carriers, carrying the BSR information in the newly transmitted MAC PDU data packet.

Optionally, in step 12, the manner of carrying the BSR information in the newly transmitted MAC PDU data packet may include:

in a heterogeneous network, sorting multiple carriers into one primary carrier and one or more secondary carriers;

when triggering transmission of current BSR information on the primary carrier of the user equipment, if MAC PDU data packets are carried on the primary carrier for transmission to a base station and a newly transmitted MAC PDU data packet is among the MAC PDU data packets carried on the carrier, carrying the BSR information in the newly transmitted MAC PDU data packet; and when triggering transmission of current BSR information on all the secondary carriers of the user equipment, if MAC PDU data packets are carried on the multiple secondary carriers for transmission to a base station and a newly transmitted MAC PDU data packet is among the MAC PDU data packets carried on all the secondary carriers, carrying the BSR information in the newly transmitted MAC PDU data packet.

Moreover, current BSR information of the primary carrier and BSR information of all the secondary carriers are independent of each other, that is, current BSR information may be multiplexed in the newly transmitted MAC PDU data packet carried on the primary carrier and the newly transmitted MAC PDU data packet carried on the secondary carrier.

Optionally, in step 12, the manner of carrying the BSR information in the newly transmitted MAC PDU data packet may include:

in a heterogeneous network, sorting multiple carriers into carrier groups, where each carrier group includes at least one carrier; and when triggering transmission of current BSR information of the user equipment, if MAC PDU data packets are carried on carriers within a carrier group for transmission to a base station and a newly transmitted MAC PDU data packet is among the MAC PDU data packets, carrying the BSR information in the newly transmitted MAC PDU data packet.

Optionally, in the buffer state reporting method of this embodiment of the present invention, when MAC PDU data packets include a newly transmitted MAC PDU data packet, BSR information is carried in the newly transmitted MAC PDU data packet for transmission to a base station.

When MAC PDU data packets include multiple newly transmitted MAC PDU data packets, BSR information is carried in one of the multiple newly transmitted MAC PDU data packets for transmission to a base station. How a user selects a newly transmitted MAC PDU to carry BSR information is an issue of algorithm implementation by a user equipment and is not specifically discussed in the present invention.

Figure 2:
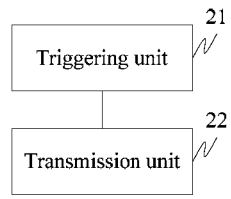
FIG. 2 is a schematic diagram of composition of a buffer state reporting apparatus according to an embodiment of the present invention.

As shown in FIG. 2, an embodiment of the present invention provides a buffer state reporting apparatus corresponding to the buffer state reporting method of the foregoing embodiment, where the apparatus includes:

a triggering unit 21, configured to trigger transmission of current buffer state report BSR information of a user equipment; and a transmission unit 2, configured to, if the user equipment will transmit media access control protocol data unit MAC PDU data packets to a base station and the MAC PDU data packets include a newly transmitted MAC PDU data packet, carry the BSR information in the newly transmitted MAC PDU data packet for transmission to the base station.

The buffer state reporting apparatus of this embodiment of the present invention may exist physically alone or be integrated with the UE.

In the present invention, the terms newly transmitted MAC PDU data packet and retransmitted MAC PDU data packet are understood as follows: If an MAC PDU data packet fails to be sent and needs to be retransmitted, a "newly transmitted MAC PDU data packet" refers to the MAC PDU data packet before retransmission and a retransmitted MAC PDU data packet refers to the MAC PDU data packet during retransmission.

It can be seen from the technical solution provided by this embodiment of the present invention that, when multiple MAC PDUs are transmitted at the same time, BSR information is carried in a newly transmitted MAC PDU, so that a base station acquires BSR information on a user side in a timely manner, thereby improving performance of uplink scheduling for a user.

The BSR information transmitted by the transmission unit may be Periodic-BSR information, or the BSR information transmitted by the transmission unit may be Regular-BSR information.

Optionally, the transmission unit 22 may be specifically configured to:

when triggering transmission of current BSR information of the user equipment, if MAC PDU data packets are carried on a single carrier for transmission to a base station and a newly transmitted MAC PDU data packet is among the MAC PDU data packets, carry the BSR information in the newly transmitted MAC PDU data packet.

In a single-carrier application scenario, for example, SU-MIMO (Single User-Multiple Input Multiple Output, single user-multiple input multiple output), a user has multiple uplink transmit antennas and a channel environment allows multiple MAC PDUs to be transmitted at the same time.

Optionally, the transmission unit 22 may be specifically configured to:

when triggering transmission of current BSR information of the user equipment, if MAC PDU data packets are carried on multiple carriers for transmission to a same base station and a newly transmitted MAC PDU data packet is among the MAC PDU data packets, carry the BSR information in the newly transmitted MAC PDU data packet.

Optionally, the transmission unit 22 may be specifically configured to:

in a heterogeneous network, when triggering transmission of current BSR information of the user equipment, if MAC PDU data packets are carried on multiple carriers for transmission to a same base station and a newly transmitted MAC PDU data packet is among the MAC PDU data packets, carry the BSR information in the newly transmitted MAC PDU data packet; or in a heterogeneous network, when triggering transmission of current BSR information of the user equipment, if MAC PDU data packets are carried on multiple carriers for transmission to different base stations, where each carrier is corresponding to a different base station, and carries an MAC PDU data packet for transmission to a corresponding base station, and a newly transmitted MAC PDU data packet is among the MAC PDU data packets, carry the BSR information in the newly transmitted MAC PDU data packet; or in a heterogeneous network, when triggering transmission of current BSR information of the user equipment, if MAC PDU data packets are carried on multiple carriers for transmission to different base stations, where some carriers among the multiple carriers are corresponding to a same base station, MAC PDU data packets are carried on the some carriers for transmission to the base station, and a newly transmitted MAC PDU data packet is among the MAC PDU data packets, carry the BSR information in the newly transmitted MAC PDU data packet.

Optionally, the transmission unit 22 may be specifically configured to:

in a heterogeneous network, sort multiple carriers into one primary carrier and multiple secondary carriers;

when triggering transmission of current BSR information of the user equipment, if MAC PDU data packets are carried on the primary carrier for transmission to a base station and a newly transmitted MAC PDU data packet is among the MAC PDU data packets, carry the BSR information in the newly transmitted MAC PDU data packet; and when triggering transmission of current BSR information of the user equipment, if MAC PDU data packets are carried on the multiple secondary carriers for transmission to a base station and a newly transmitted MAC PDU data packet is among the MAC PDU data packets, carry the BSR information in the newly transmitted MAC PDU data packet.

Optionally, the transmission unit 22 may be specifically configured to:

in a heterogeneous network, sort multiple carriers into carrier groups, where each carrier group includes at least one carrier; and when triggering transmission of current BSR information of the user equipment, if MAC PDU data packets are carried on carriers within a carrier group for transmission to a base station and a newly transmitted MAC PDU data packet is among the MAC PDU data packets, carry the BSR information in the newly transmitted MAC PDU data packet.

Transmission of current BSR information of the user equipment is triggered in a triggering mode, for example, by using a BSR timer. A specific triggering manner may be understood with reference to the prior art, and details are not described herein again.

When MAC PDU data packets include a newly transmitted MAC PDU data packet, BSR information is carried in the newly transmitted MAC PDU data packet for transmission to a base station. When MAC PDU data packets include multiple newly transmitted MAC PDU data packets, BSR information is carried in one of the multiple newly transmitted MAC PDU data packets for transmission to a base station. How a user selects a newly transmitted MAC PDU to carry BSR information is an issue of algorithm implementation by a user equipment and is not specifically discussed in the present invention.

The buffer state reporting apparatus of this embodiment of the present invention and the composition of the apparatus may be understood with reference to actions of the execution body of the buffer state reporting method of the foregoing embodiment, and details are not described herein again.

The following describes the buffer state reporting method provided by this embodiment of the present invention in combination with specific application scenarios. Specifically, it is set that there is a one-to-one correspondence between an uplink HARQ process of a user and an MAC PDU transmitted by the user, that is, each HARQ process transmits only one MAC PDU, different HARQ processes transmit different MAC PDUs, and multiple HARQ processes are used to transmit multiple MAC PDUs at the same time. After a base station successfully receives an MAC PDU, an HARQ process corresponding to the MAC PDU enters an idle state. When the HARQ is occupied again due to scheduling by the base station, a one-to-one mapping relationship is re-established between the HARQ process and a PDU transmitted by the HARQ process.

Application Scenario 1

Figure 3:
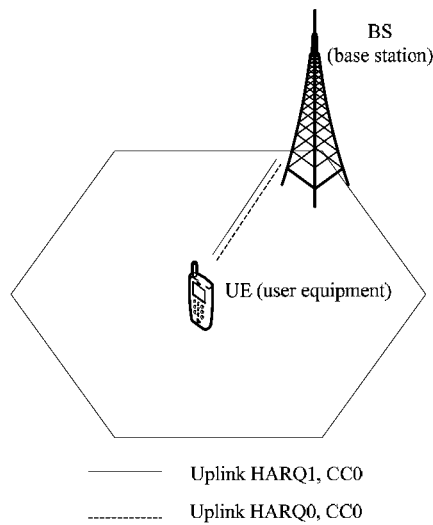
FIG. 3 is a schematic diagram 1 illustrating an application scenario of a buffer state reporting method according to an application scenario 1 of an embodiment of the present invention.

As shown in FIG. 3, a UE communicates with a base station BS (Base Station, base station) on a carrier CC0, and in a UE uplink SU-MIMO transmission mode, the number of uplink transmit antennas of the UE and a channel environment allow multiple MAC PDUs to be transmitted at the same time. It is set that the total number of HARQ processes of the UE on CC0 is L0 and at most L0 MAC PDUs are simultaneously transmitted on CC0 in the uplink. FIG. 3 specifically shows a case in which L0=2.

Figure 4:
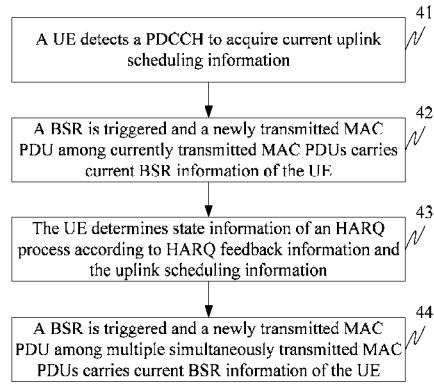
FIG. 4 is a schematic diagram 2 illustrating an application scenario of a buffer state reporting method according to an application scenario 1 of an embodiment of the present invention.

As shown in FIG. 4, a buffer state reporting method provided by an embodiment of the present invention includes the following steps:

41: A UE detects a PDCCH (Physical Downlink Control Channel, physical downlink control channel) to acquire current uplink scheduling information.

Figure 5:
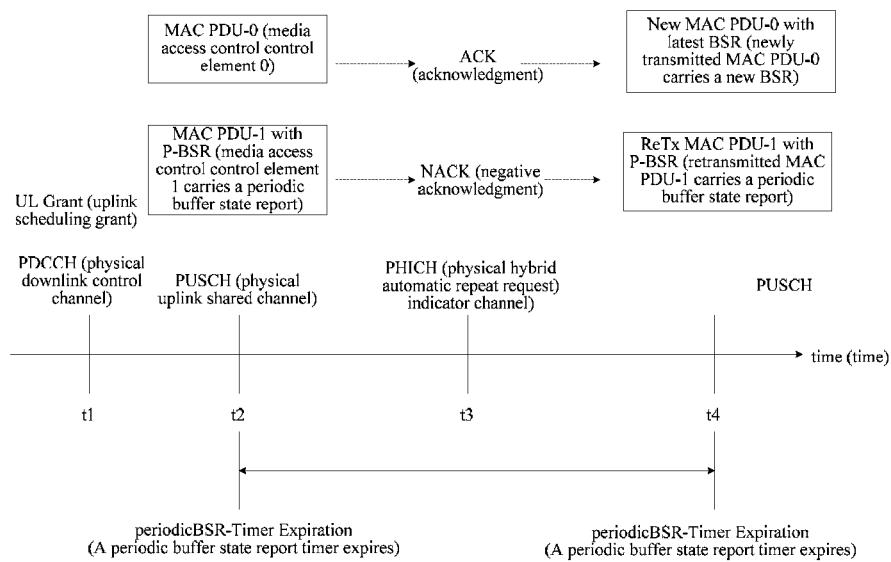
FIG. 5 is a schematic diagram 3 illustrating an application scenario of a buffer state reporting method according to an application scenario 1 of an embodiment of the present invention.

As shown in FIG. 5, it is assumed that, before time t1, all HARQ processes are in an idle state and a BSR is not triggered. At time t1, a user detects the PDCCH to acquire current uplink scheduling information which indicates that, at time t2, m HARQ processes are used to simultaneously transmit m MAC PDUi (i$\in$0, 1, . . . , L0−1; m≤L0).

When m<L0, it indicates that some HARQ processes are in the idle state; when m=L0, it indicates that all HARQ processes are in an occupied state.

Correspondingly, uplink transmission of MAC PDUi is implemented by an HARQi (i$\in$0, 1, . . . , L0−1; m≤L0) process.

42: A BSR is triggered and a newly transmitted MAC PDU among currently transmitted MAC PDUs carries current BSR information of the UE.

As shown in FIG. 5, at time t2, if a Periodic BSR or Regular BSR is triggered, MAC PDUk and other MAC PDUs are simultaneously transmitted in the uplink in a space division multiplexing manner, where it is set that current BSR information of the UE is multiplexed in MAC PDUk (k$\in$0, 1, . . . , L0−1) because a priority level of the Periodic BSR or Regular BSR is higher than a priority of a part of logic channels.

Here, among all the initially transmitted m MAC PDUi (i$\in$0, 1, . . . , L0−1; m≤L0), at most only one MAC PDU carries current BSR information of the UE.

43: The UE determines state information of an HARQ process according to HARQ (Hybrid Automatic Repeat Request, hybrid automatic repeat request) feedback information and the uplink scheduling information.

As shown in FIG. 5, the UE detects the HARQ feedback information from a base station at time t3, where the HARQ feedback information reflects whether the base station correctly receives the MAC PDUi described in step 41.

If the HARQ feedback information for MAC PDUi is ACK (Acknowledgment, acknowledgment), MAC PDUi is received by the base station correctly. At this time, the HARQi process is in a suspended state, and when the channel condition permits, the base station may schedule a new PDU for the UE to occupy the HARQi process.

If the HARQ feedback information for MAC PDUi is NACK (Negative Acknowledgment, negative acknowledgment), MAC PDUi is received incorrectly. At this time, the HARQi process continues to be in the occupied state, so as to retransmit MAC PDUi.

The UE detects the PDCCH at time t3 to acquire uplink scheduling information corresponding to time t4. If the uplink scheduling information includes uplink new transmission or uplink retransmission scheduling information, an HARQ process corresponding to the uplink scheduling information is in the occupied state.

Finally, the UE determines state information (that is, the occupied or idle state) of all the HARQ processes at time t4 according to the acquired HARQ feedback information and uplink scheduling information.

44: A BSR is triggered and a newly transmitted MAC PDU among multiple MAC PDUs that are transmitted at the same time carries current BSR information of the UE.

As shown in FIG. 5, at time t4, all HARQ processes that are in the occupied state and among the uplink HARQ processes of the UE transmit corresponding MAC PDUs in the space division multiplexing manner.

If a Periodic BSR or Regular BSR is in a triggered state and all of the currently occupied HARQ processes are in a retransmitted state, the triggered state of the BSR is retained.

If a Periodic BSR or Regular BSR is in the triggered state and at least one of all of the currently occupied HARQ processes is in a new transmission state, at most only one MAC PDU among all the HARQ processes in the new transmission state carries current BSR information of the UE. If an HARQ1 process is in the new transmission state, $0 \leq 1 \leq L0-1$, MAC PDU1 corresponding to the HARQ1 process carries current BSR information of the UE.

How a user selects a newly transmitted MAC PDU to carry BSR information is an issue of algorithm implementation by a user equipment and is not specifically discussed in the present invention.

Application Scenario 2

Figure 6:
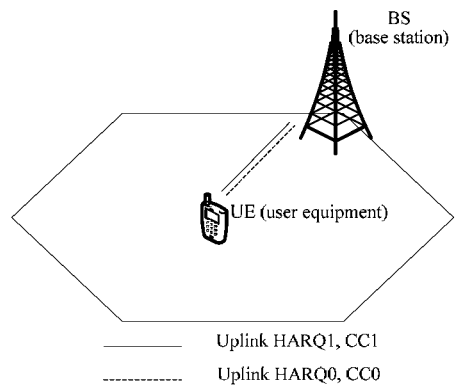
FIG. 6 is a schematic diagram 4 illustrating an application scenario of a buffer state reporting method according to an application scenario 2 of an embodiment of the present invention.

As shown in FIG. 6, a UE uses a carrier set CCi (i=0, 1, . . . , C) to perform uplink communication at the same time, where C is the number of carriers. On each carrier CCi, an uplink communication connection is established between the UE and a BS. The number of uplink HARQ processes that a user has on CCi is Li, that is, the maximum number of MAC PDUs transmitted by the user on this link is Li. The total number of available processes on the carrier set is $$L = \sum_{i=0}^{C} Li.$$

FIG. 6 shows a case in which C=2.

Figure 7:
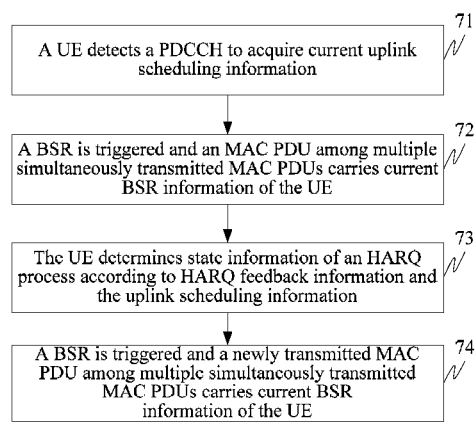
FIG. 7 is a schematic diagram 5 illustrating an application scenario of a buffer state reporting method according to an application scenario 2 of an embodiment of the present invention.

As shown in FIG. 7, a buffer state reporting method provided by an embodiment of the present invention includes the following steps:

71: A UE detects a PDCCH to acquire current uplink scheduling information.

Figure 8:
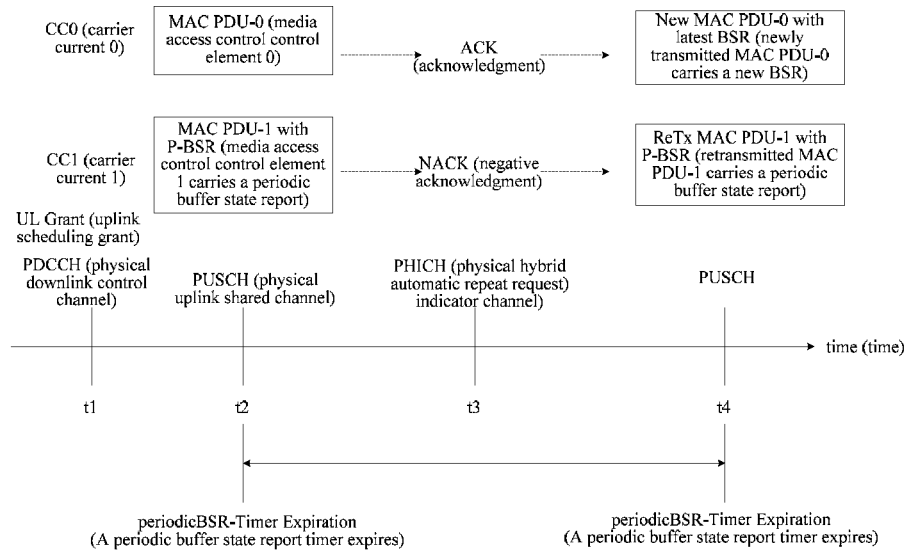
FIG. 8 is a schematic diagram 6 illustrating an application scenario of a buffer state reporting method according to an application scenario 2 of an embodiment of the present invention.

As shown in FIG. 8, it is assumed that, before time t1, all HARQ processes are in an idle state and a BSR is not triggered. At time t1, the UE detects the PDCCH to acquire current uplink scheduling information which indicates that, at time t2, m HARQ processes are used to simultaneously transmit m MAC PDUi (i∈0, 1, . . . , L−1; m≤L). When m<L, it indicates that some HARQ processes are in the idle state; when m=L, it indicates that all HARQ processes are in an occupied state.

72: A BSR is triggered and an MAC PDU among multiple MAC PDUs that are transmitted at the same time carries current BSR information of the UE.

As shown in FIG. 8, at time t2, if a Periodic BSR or Regular BSR is triggered, because a priority level of the Periodic BSR or Regular BSR is higher than a priority of a part of logic channels, it is set that current BSR information of the UE is multiplexed in MAC PDUk (k∈0, 1, . . . , L−1), MAC PDUk and other MAC PDUs transmitted on the same carrier are simultaneously transmitted in the uplink in a space division multiplexing manner and/or other MAC PDUs transmitted on different carriers are simultaneously transmitted in the uplink in a frequency division multiplexing manner.

Here, among all the initially transmitted m MAC PDUi, at most only one MAC PDUk carries current BSR information of the UE.

73: The UE determines state information of an HARQ process according to HARQ feedback information and the uplink scheduling information.

As shown in FIG. 8, the UE detects HARQ feedback information from a base station at time t3, where the HARQ feedback information reflects whether the base station correctly receives the MAC PDUi described in step 71.

If the HARQ feedback information for MAC PDUi is ACK, MAC PDUi is received by the base station correctly. At this time, HARQi is in a suspended state, and when the channel condition permits, the base station may schedule a new MAC PDU for the UE to occupy the HARQi process.

If the HARQ feedback information for the PDUi is NACK, MAC PDUi is received incorrectly. At this time, the HARQi process continues to be in the occupied state, so as to retransmit MAC PDUi.

The UE detects the PDCCH at time t3 to acquire uplink scheduling information corresponding to time t4. If the uplink scheduling information includes uplink new transmission or uplink retransmission scheduling information, an HARQ process corresponding to the uplink scheduling information is in the occupied state.

Finally, the user determines state information (that is, the occupied or idle state) of all the HARQ processes at time t4 according to the acquired HARQ feedback information and uplink scheduling information.

74: A BSR is triggered and a newly transmitted MAC PDU among multiple MAC PDUs that are transmitted at the same time carries current BSR information of the UE.

At time t4, all HARQ processes that are in the occupied state and among uplink HARQ processes of the UE transmit corresponding MAC PDUs on multiple carriers in the frequency division multiplexing manner and/or space division multiplexing manner.

If a Periodic BSR or Regular BSR is in a triggered state and all of the currently occupied HARQ processes are in a retransmitted state, the triggered state of the BSR is retained.

If a Periodic BSR or Regular BSR is in the triggered state and at least one of all of the currently occupied HARQ processes is in a new transmission state, at most only one MAC PDU among all the HARQ processes in the new transmission state carries buffer state information. It is assumed that an HARQ1 process is in the new transmission state (1∈0, 1, . . . , L−1), MAC PDU1 corresponding to the HARQ1 process carries current BSR information of the UE.

How a user selects a newly transmitted MAC PDU to carry BSR information is an issue of algorithm implementation by a user equipment and is not specifically discussed in the present invention.

For a purpose of describing scenarios 3, 4 and 5 more accurately, meanings of different base stations (or base stations) and a same base station mentioned in scenarios 3, 4 and 5 are explained in the following examples.

Figure 9:
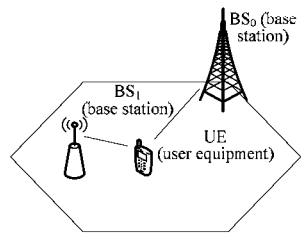
FIG. 9 is a schematic diagram 8 illustrating an application scenario of a buffer state reporting method according to an application scenario 3 of an embodiment of the present invention.

As shown in FIG. 9, although both BS0 and BS1 receive an uplink signal from a UE, whether BS0 receives and processes an uplink signal of the UE is transparent to a user, and therefore it can be considered that a base station in uplink communication with the UE is BS1.

Figure 10:
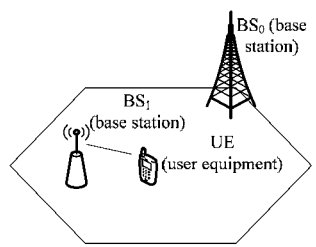
FIG. 10 is a schematic diagram 9 illustrating an application scenario of a buffer state reporting method according to an application scenario 3 of an embodiment of the present invention.

As shown in FIG. 10, among BS0 and BS1, only BS1 receives an uplink signal from a UE, whether BS0 receives and processes an uplink signal of the UE is transparent to a user, and therefore it can be considered that a base station in uplink communication with the UE is BS1.

Figure 11:
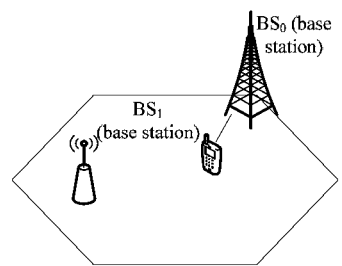
FIG. 11 is a schematic diagram 10 illustrating an application scenario of a buffer state reporting method according to an application scenario 3 of an embodiment of the present invention.

As shown in FIG. 11, among BS0 and BS1, only BS0 receives an uplink signal from a UE, whether BS1 receives and processes an uplink signal of the UE is transparent to the UE, and therefore it can be considered that a base station in uplink communication with the UE is BS0.

Figure 12:
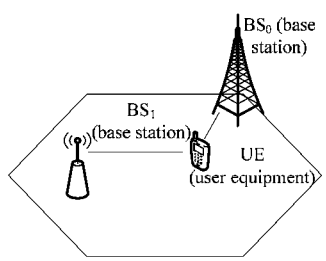
FIG. 12 is a schematic diagram 11 illustrating an application scenario of a buffer state reporting method according to an application scenario 3 of an embodiment of the present invention.

As shown in FIG. 12, although both BS0 and BS1 receive an uplink signal from a UE, whether BS1 receives and processes an uplink signal of the UE is transparent to the UE, and therefore it can be considered that a base station in uplink communication with the UE is BS0.

If the UE uses two carriers, if uplink communication between the UE and the base station on a carrier CC0 proceeds as shown in FIG. 9 and uplink communication between the UE and the base station on CC1 proceeds as shown in FIG. 10, the base station in uplink communication with the user UE is the same base station BS1;

if uplink communication between the UE and the base station on a carrier CC0 proceeds as shown in FIG. 11 and uplink communication between the UE and the base station on CC1 proceeds as shown in FIG. 12, the base station in uplink communication with the user UE is the same base station BS0; and if uplink communication between the UE and the base station on a carrier CC0 proceeds as shown in FIG. 9 or FIG. 10 and uplink communication between the UE and the base station on CC1 proceeds as shown in FIG. 11 or FIG. 12, the base stations in uplink communication with the user UE are different base stations which are BS1 and BS0 respectively.

Application Scenario 3

Figure 13:
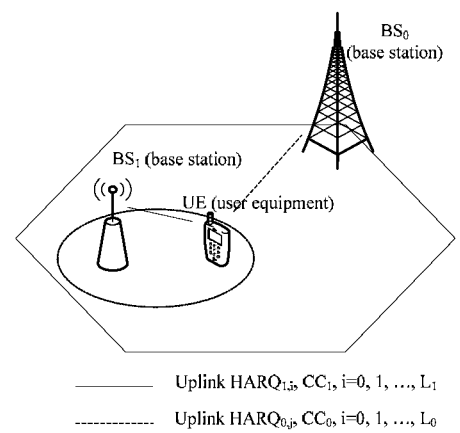
FIG. 13 is a schematic diagram 12 illustrating an application scenario of a buffer state reporting method according to an application scenario 3 of an embodiment of the present invention.

A UE uses a carrier set CCi (i=0, 1, . . . , C) to perform uplink communication at the same time, where C is the number of carriers. On each carrier CCi, an uplink communication connection is established between the UE and BSi. On different carriers, the BSi in communication with the UE may be a same base station or different base stations. The number of uplink HARQ processes that the UE has on a link between the UE and BSi is Li, that is, the maximum number of PDUs transmitted by the UE on the link is Li. FIG. 13 shows a case in which C=2.

If BSj (j∈[0, 1, . . . , C]) with which the UE communicates in the uplink on some carriers CCj (j∈[0, 1, . . . , C]) in the carrier set CCi (i=0, 1, . . . , C) are different base stations, on each carrier in the carrier set, the buffer state reporting method of this embodiment of the present invention may be used to report BSR information of the carrier with reference to the method in the foregoing application scenario 1.

If BSj (j∈[0, 1, . . . , C]) with which the UE communicates in the uplink on some carriers CCj (j∈[0, 1, . . . , C]) in the carrier set CCi (i=0, 1, . . . , C) are a same base station, in the carrier set, the buffer state reporting method of this embodiment of the present invention may be used to report BSR information of the carrier with reference to the method in the foregoing application scenario 2.

It can be seen that the UE may report a buffer state to different base stations independently, that is, BSR information of the UE is multiplexed in MAC PDUs that are in a new transmission state and sent to the base stations, and in MAC PDUs that are in the new transmission state and received by the same base station, at most only one MAC PDU carries current BSR information of the UE.

How a user selects a newly transmitted MAC PDU to carry BSR information is an issue of algorithm implementation by a user equipment and is not specifically discussed in the present invention.

Application Scenario 4

Figure 14:
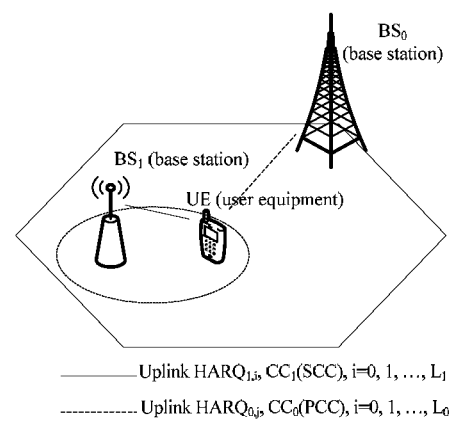
FIG. 14 is a schematic diagram 13 illustrating an application scenario of a buffer state reporting method according to an application scenario 4 of an embodiment of the present invention.

As shown in FIG. 14, a UE uses a carrier set CCi (i=0, 1, . . . , C) to perform uplink communication at the same time, where C is the number of carriers. On each carrier CCi, an uplink communication connection is established between the UE and BSi. BSi with which the UE communicates on different secondary carriers may be a same base station or different base stations. The number of uplink HARQ processes that the UE has on a link between the UE and BSi is Li, that is, the maximum number of PDUs transmitted by the UE on the link is Li. In the carrier set CCi (i=0, 1, . . , C), it is set that CC0 is a primary carrier (Primary Carrier Current, PCC represented in FIG. 14), and other carriers, that is, all other carriers in the carrier set except CC0, are secondary carriers (Secondary Carrier Current, SCC represented in FIG. 14). A difference between a primary carrier and a secondary carrier is that a content types carried in the primary carrier and the secondary carrier are different. FIG. 10 shows a case in which C=2.

On the primary carrier (CC0), the buffer state reporting method of this embodiment of the present invention may be used to report BSR information of the primary carrier with reference to the method in the foregoing application scenario 1.

On the secondary carriers, the buffer state reporting method of this embodiment of the present invention may be used to report BSR information with reference to the method in the foregoing application scenario 2, that is, if transmitting BSR information of all the secondary carriers is triggered and a newly transmitted MAC PDU is among MAC PDUs carried on all the secondary carriers, the BSR information of all the secondary carriers is carried in the newly transmitted MAC PDU. A difference between the method for reporting BSR information of the secondary carriers and the CSR information reporting method in the scenario 2 is that, in this scenario, communication objects of a user on the secondary carriers may be a same base station or different base stations, whereas in the scenario 2, communication objects of a user on all carriers are a same base station.

It can be seen that current BSR information of the UE on the primary carrier and current BSR information of the UE in all the secondary carriers are independent of each other, that is, current BSR information of the primary carrier and current BSR information of the secondary carriers are separately multiplexed in MAC PDUs that are in a new transmission state and carried on the primary carrier and the secondary carriers.

How a user selects a newly transmitted MAC PDU to carry BSR information is an issue of algorithm implementation by a user equipment and is not specifically discussed in the present invention.

Application Scenario 5

A UE uses a carrier set CCi (i=0, 1, . . . , C) to perform uplink communication at the same time, where C is the number of carriers. On each carrier CCi, an uplink communication connection is established between the UE and BSi. BSi with which the UE communicates on different secondary carriers may be a same base station or different base stations. The base station sorts the carrier set CCi (i=0, 1, ..., C) of a user into G carrier groups, where each carrier group includes at least one carrier.

For each carrier group, the buffer state reporting method of this embodiment of the present invention may be used to report BSR information with reference to the method in the foregoing application scenario 2, that is, if transmitting BSR information of a current carrier group is triggered and newly transmitted MAC PDUs is among MAC PDUs carried by HARQ processes of the current carrier group, the BSR information of the current carrier group is carried in one of the newly transmitted MAC PDUs. A difference between the method for reporting BSR information of a carrier group and the BSR information reporting method in the scenario 2 is that, in this scenario, communication objects of a user on each carrier within the carrier group may be a same base station or different base stations, whereas in the scenario 2, communication objects of a user on all carriers are a same base station.

How a user selects a newly transmitted MAC PDU to carry BSR information is an issue of algorithm implementation by a user equipment and is not specifically discussed in the present invention.

The foregoing descriptions are merely exemplary implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disc, a read-only memory (Read-Only Memory, ROM), a random access memory (Random Access Memory, RAM), or the like.

What is claimed is:

1. A buffer state reporting method, comprising:
triggering transmission of buffer state report (BSR) information of a user equipment; and
in response to the user equipment transmitting media access control protocol data unit (MAC PDU) data packets to a base station, wherein the MAC PDU data packets comprise a newly transmitted MAC PDU data packet, carrying the BSR information in the newly transmitted MAC PDU data packet for transmission to the base station, wherein carrying the BSR information in the newly transmitted MAC PDU data packet comprises:
in a heterogeneous network, when triggering the transmission of the BSR information of the user equipment, if the MAC PDU data packets are carried on multiple carriers for transmission to a same base station and the newly transmitted MAC PDU data packet is among the MAC PDU data packets, then carrying the BSR information in the newly transmitted MAC PDU data packet; or
in a heterogeneous network, when triggering the transmission of the BSR information of the user equipment, if the MAC PDU data packets are carried on multiple carriers for transmission to different base stations, wherein each carrier is corresponding to a different base station, each carrier carries a MAC PDU data packet for transmission to a corresponding base station, and the newly transmitted MAC PDU data packet is among the MAC PDU data packets, then carrying the BSR information in the newly transmitted MAC PDU data packet; or
in a heterogeneous network, when triggering the transmission of the BSR information of the user equipment, if the MAC PDU data packets are carried on multiple carriers for transmission to different base stations, wherein some carriers among the multiple carriers are corresponding to a same base station, the some carriers carry a MAC PDU data packet for transmission to the same base station, and the newly transmitted MAC PDU data packet is among the MAC PDU data packets, then carrying the BSR information in the newly transmitted MAC PDU data packet,
wherein the BSR information is periodic BSR information, or the BSR information is regular BSR information.

2. A buffer state reporting method, comprising:
triggering transmission of buffer state report (BSR) information of a user equipment; and
in response to the user equipment transmitting media access control protocol data unit (MAC PDU) data packets to a base station, wherein the MAC PDU data packets comprise a newly transmitted MAC PDU data packet, carrying the BSR information in the newly transmitted MAC PDU data packet for transmission to the base station, wherein carrying the BSR information in the newly transmitted MAC PDU data packet comprises:
in a heterogeneous network, sorting multiple carriers into one primary carrier and multiple secondary carriers;
when triggering the transmission of the BSR information of the user equipment, if the MAC PDU data packets are carried on the one primary carrier for transmission to the base station and the newly transmitted MAC PDU data packet is among the MAC PDU data packets, then carrying the BSR information in the newly transmitted MAC PDU data packet; and
when triggering the transmission of the BSR information of the user equipment, if the MAC PDU data packets are carried on the multiple secondary carriers for transmission to the base station and the newly transmitted MAC PDU data packet is among the MAC PDU data packets, then carrying the BSR information in the newly transmitted MAC PDU data packet,
wherein the BSR information is periodic BSR information, or the BSR information is regular BSR information.

3. A buffer state reporting method, comprising:
triggering transmission of buffer state report (BSR) information of a user equipment; and
in response to the user equipment transmitting media access control protocol data unit (MAC PDU) data packets to a base station, wherein the MAC PDU data packets comprise a newly transmitted MAC PDU data packet, carrying the BSR information in the newly transmitted MAC PDU data packet for transmission to the base station, wherein carrying the BSR information in the newly transmitted MAC PDU data packet comprises:
in a heterogeneous network, sorting multiple carriers into carrier groups, wherein each carrier group comprises at least one carrier; and
when triggering the transmission of the BSR information of the user equipment, if the MAC PDU data packets are carried on carriers within a carrier group for transmission to the base station and the newly transmitted MAC PDU data packet are is among the MAC PDU data packets, then carrying the BSR information in the newly transmitted MAC PDU data packet,
wherein the BSR information is periodic BSR information, or the BSR information is regular BSR information.

4. A buffer state reporting apparatus, comprising:
a triggering processor, configured to trigger transmission of buffer state report (BSR) information of a user equipment; and
a transmission unit, configured to:
in response to the user equipment transmitting media access control protocol data unit (MAC PDU) data packets to a base station, wherein the MAC PDU data packets comprise a newly transmitted MAC PDU data packet, carry the BSR information in the newly transmitted MAC PDU data packet for transmission to the base station; and
wherein the transmission unit is further configured to:
in a heterogeneous network, when triggering the transmission of the BSR information of the user equipment, if the MAC PDU data packets are carried on multiple carriers for transmission to a same base station and the newly transmitted MAC PDU data packet is among the MAC PDU data packets, then carry the BSR information in the newly transmitted MAC PDU data packet; or
in a heterogeneous network, when triggering the transmission of the BSR information of the user equipment, if the MAC PDU data packets are carried on multiple carriers for transmission to different base stations, wherein each carrier is corresponding to a different base station, each carrier carries a MAC PDU data packet for transmission to a corresponding base station, and the newly transmitted MAC PDU data packet is among the MAC PDU data packets, then carry the BSR information in the newly transmitted MAC PDU data packet; or
in a heterogeneous network, when triggering the transmission of the BSR information of the user equipment, if the MAC PDU data packets are carried on multiple carriers for transmission to different base stations, wherein some carriers among the multiple carriers are corresponding to a same base station, the some carriers carry a MAC PDU data packet for transmission to the same base station, and the newly transmitted MAC PDU data packet is among the MAC PDU data packets, then carry the BSR information in the newly transmitted MAC PDU data packet,
wherein the BSR information is periodic BSR information, or the BSR information is regular BSR information.

5. A buffer state reporting apparatus, comprising:
a triggering processor, configured to trigger transmission of buffer state report (BSR) information of a user equipment; and
a transmission unit, configured to:
in response to the user equipment transmitting media access control protocol data unit (MAC PDU) data packets to a base station, wherein the MAC PDU data packets comprise a newly transmitted MAC PDU data packet, carry the BSR information in the newly transmitted MAC PDU data packet for transmission to the base station;
in a heterogeneous network, sort multiple carriers into one primary carrier and multiple secondary carriers;
when triggering the transmission of the BSR information of the user equipment, if the MAC PDU data packets are carried on the one primary carrier for transmission to the base station and the newly transmitted MAC PDU data packet is among the MAC PDU data packets, then carry the BSR information in the newly transmitted MAC PDU data packet; and
when triggering the transmission of the BSR information of the user equipment, if the MAC PDU data packets are carried on the multiple secondary carriers for transmission to the base station and the newly transmitted MAC PDU data packet is among the MAC PDU data packets, then carry the BSR information in the newly transmitted MAC PDU data packet,
wherein the BSR information is periodic BSR information, or the BSR information is regular BSR information.

6. A buffer state reporting apparatus, comprising:
a triggering processor, configured to trigger transmission of buffer state report (BSR) information of a user equipment; and
a transmission unit, configured to:
in response to the user equipment transmitting media access control protocol data unit (MAC PDU) data packets to a base station, wherein the MAC PDU data packets comprise a newly transmitted MAC PDU data packet, carry the BSR information in the newly transmitted MAC PDU data packet for transmission to the base station;
in a heterogeneous network, sort multiple carriers into carrier groups, wherein each carrier group comprises at least one carrier; and
when triggering the transmission of the BSR information of the user equipment, if the MAC PDU data packets are carried on carriers within a carrier group for transmission to the base station and the newly transmitted MAC PDU data packet is among the MAC PDU data packets, carry the BSR information in the newly transmitted MAC PDU data packet,
wherein the BSR information is periodic BSR information, or the BSR information is regular BSR information.

* * * * *

UNITED STATES PATENT AND TRADEMARK OFFICE
CERTIFICATE OF CORRECTION

| | | |
|---|---|---|
| PATENT NO. | : 9,532,264 B2 | |
| APPLICATION NO. | : 14/457695 | |
| DATED | : December 27, 2016 | |
| INVENTOR(S) | : Zhang et al. | |

It is certified that error appears in the above-identified patent and that said Letters Patent is hereby corrected as shown below:

In the Claims

Column 15, Line 13, "data packet are is" should read -- data packet is --.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*